United States Patent

[11] 3,589,179

| [72] | Inventor | Ioan Nicolau |
| | | Cimpina, Romania |
| [21] | Appl. No. | 790,715 |
| [22] | Filed | Jan. 13, 1969 |
| [45] | Patented | June 29, 1971 |
| [73] | Assignee | Institutul De Cercetari Si Proiectari Pentru Industria Extractiva De Titei Si Gaze Cimpina, Romania |
| [32] | Priority | Jan. 13, 1968 |
| [33] | | Romania |
| [31] | | 55,624 |

[54] TORQUE GAUGE FOR DRILLING TONGS
5 Claims, 6 Drawing Figs.

[52] U.S. Cl. .................................................. 73/139, 81/52.5
[51] Int. Cl. ...................................................... B25b 23/14, G01l 5/24
[50] Field of Search ............................................ 73/134, 135, 136, 139; 81/52.5, 53.17

[56] References Cited
UNITED STATES PATENTS
| 1,047,696 | 12/1912 | Phillips et al. ................. | 73/141 |
| 1,080,937 | 12/1913 | Stephens ....................... | 73/141 |
| 2,157,723 | 5/1939 | Wilson ......................... | 73/143 |
| 2,211,401 | 8/1940 | Zimmerman .................. | 73/139 |
| 2,527,456 | 10/1950 | Schmeling .................... | 73/139 |

Primary Examiner—Richard C. Queisser
Assistant Examiner—J. W. Whalen
Attorney—Waters, Roditi & Schwartz ABSTRACT: A tong lever of a torque gauge has an opening in which the arms of a U-shaped support member are inserted, the support member supporting one surface of a compression dynamometer transducer while the opposite surface is engaged by a yoke which is coupled to the support member via a bolt. A tension cable passes through the opening in the tong lever and undergoes a bend thereat, the end of the cable being mounted on the bolt. In one embodiment the yoke has arms disposed within the U-shaped support and direct readout of torque is obtained at the transducer irrespective of bend angle whereas in a second embodiment the arms of the yoke are outside the U-shaped support member and the readout of torque is proportional to the bend angle.

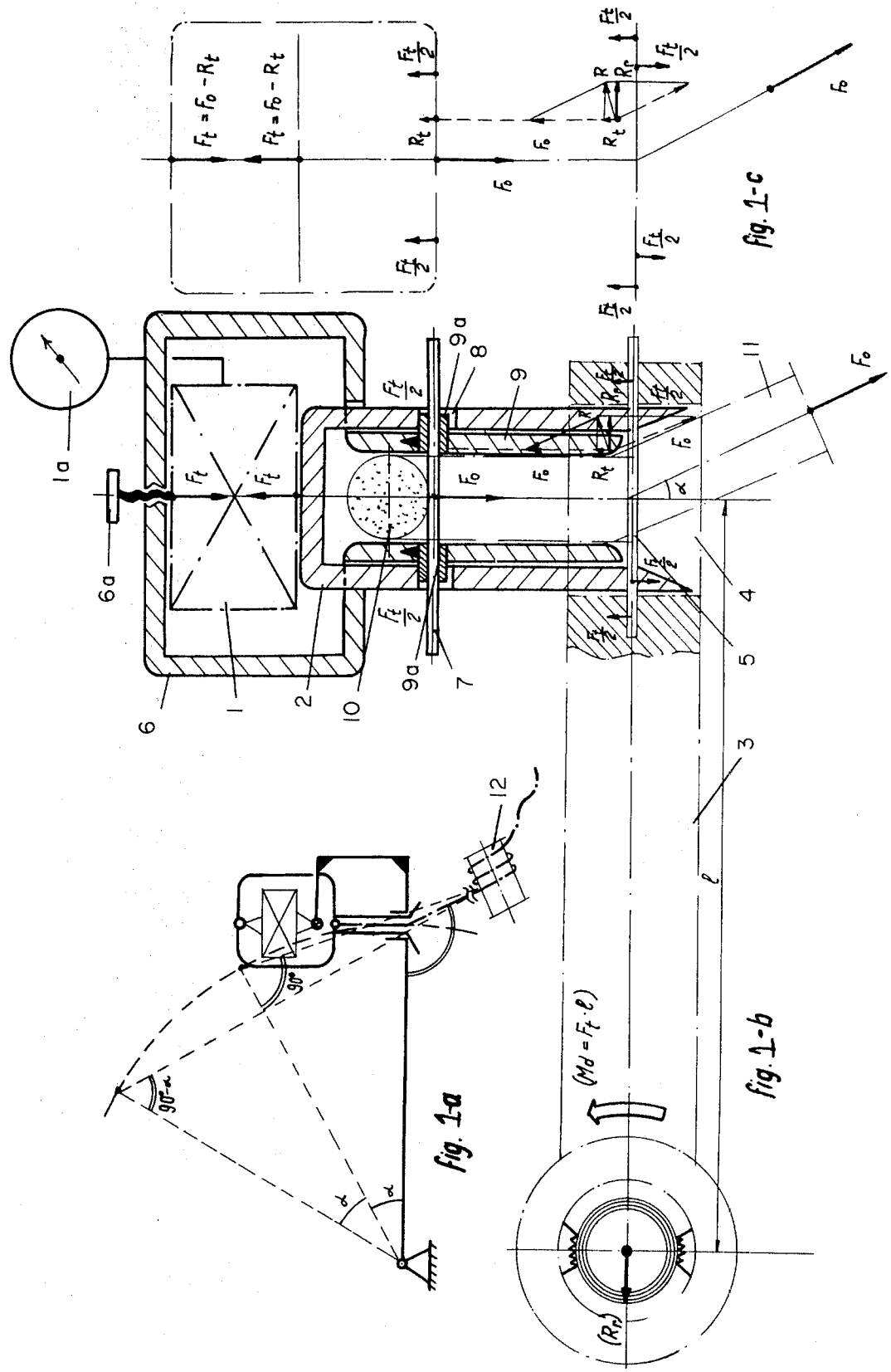

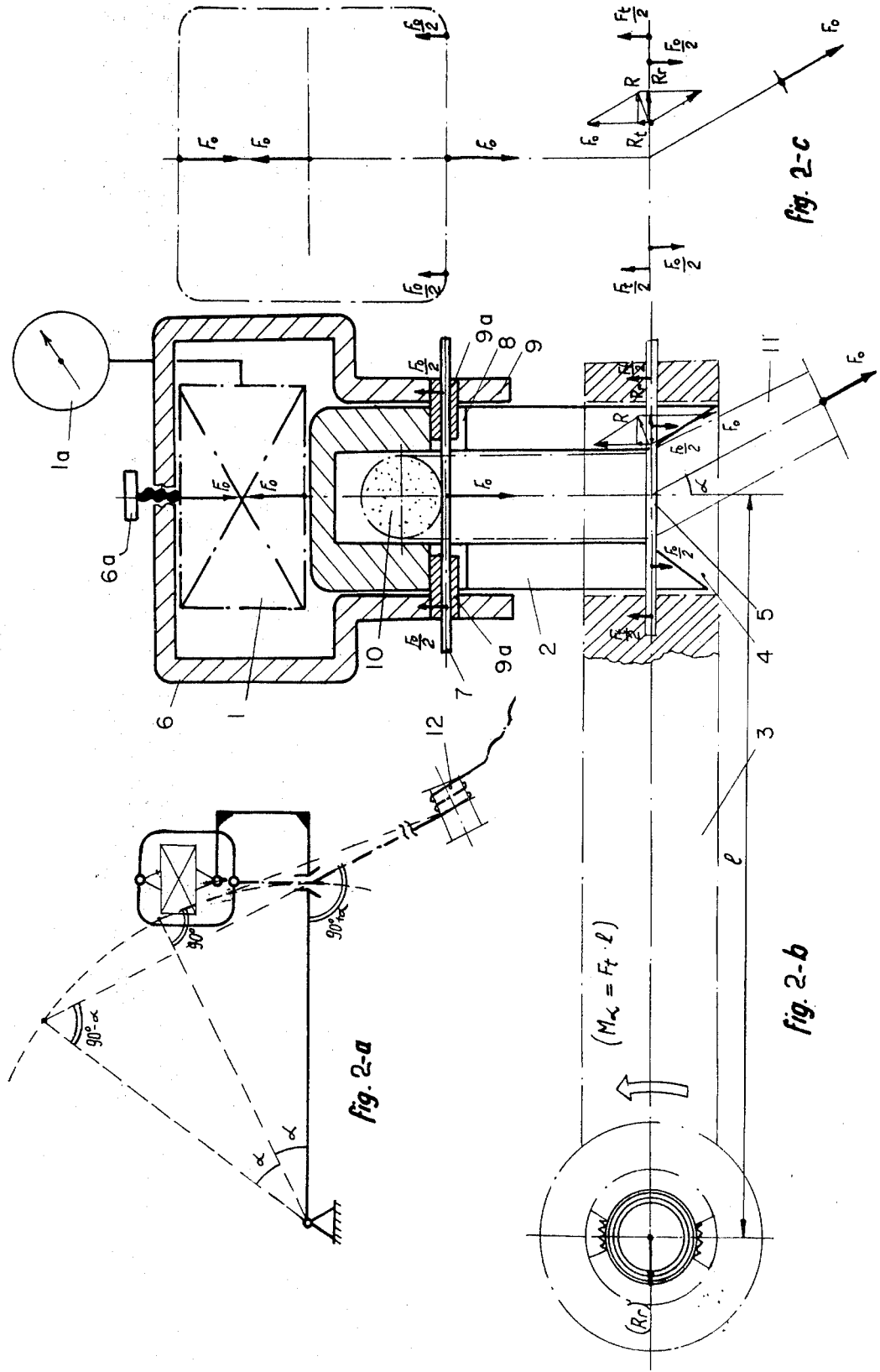

TORQUE GAUGE FOR DRILLING TONGS

The present invention relates to a torque gauge suitable to indicate the torque applied by tongs during makeup of drill-pipes and casings.

Torque gauges are in use, which consist of a tension dynamometer located on the tong line being handled from the cathead of the drilling rig. The disadvantage of these torque indicators is their poor accuracy due to the fact that the theoretical torque value, $Md$, represented by the line force $F_o$ applied to the tong lever of length $l$ determined by the tong lever, according to the relation $Md = F \cdot F_o$, is influenced by the angle $90° \pm \alpha$ between the tong line axis and the tong lever. As a result the actual torque, $Md$ actual, exhibits a valve different from the theoretical one, as shown by the relation $Md$ actual $= l \cdot F_o \cdot \cos \alpha$.

The error of these torque gauges is proportional to the angle $\alpha$, i.e. to the angular movement of the tong lever with respect to its theoretical position which is perpendicular to the pull line. In consequence, for the maximum angles of $90° \pm 20°$ occuring in practice, errors of more than 6 percent are introduced, which exceeds by far the errors of 1 to 3 percent of the dynamometer transducer commonly used. At the same time, dependability and safety of the hydraulic tension dynamometer is low, owing both to friction of the sealing means and to the fluid loss brought about by the wear of the sealing means.

The present invention eliminates these disadvantages in that for the purpose of providing a torque gauge of high accuracy based on the measurement of the force imposed normally on the axis of the tong lever end, and in order to eliminate the error introduced by the variations in the angular movement of the tong lever end, it employs a compression dynamometer transducer located directly on the tong lever, with one of the resting side surfaces of the dynamometer transducer perpendicular to the tong lever end and attached to a U-shaped support member integral with the tong lever end and opposed to the working direction of the pull line, the other resting side surface of the dynamometer transducer being secured to a yoke provided with a bolt located between the transducer and the tong lever, said bolt receiving the line force of the pull line, thereby the bending of said line takes place opposite the tong lever end due to the angle of $90° \pm \alpha$ formed by the line with the tong lever. As a result the line bending portion resting on the yoke arms secured inside the U-shaped support member, exerts a reaction thereon, whereby the difference between the line pull and the component of the reaction normal to the tong end is exerted upon the dynamometer transducer, said difference representing the component of the line pull itself normal to the tong end, this arrangement permitting to measure the actual torque during the operations, regardless of the angle formed between the line and tong.

In a simpler embodiment of the invention, also employing a compression dynamometer transducer, the yoke arms are secured outside of the U-shaped support member, whereby the reaction caused by the line bending acts upon the U-shaped support member and further upon the tong lever end, so that the line pull is directly applied to the compression dynamometer transducer. As a result, a modified torque is being measured, depending upon the angle of the line to the tong. This embodiment is usable wherein the line is substantially perpendicular to the tong lever.

BRIEF DESCRIPTION OF THE DRAWING

FIG. 1a is a diagrammatic view of the torque gauge according to the invention,

FIG. 1b is an enlarged sectional view of a portion of the gauge;

FIG. 1c is a vector diagram showing the forces acting on the gauge;

FIGS. 2a—2c are views corresponding to FIGS. 1a—1c of another embodiment. DETAILED DESCRIPTION Referring to FIGS. 1a—1c therein is shown a torque gauge according to the invention including a dynamometer transducer 1 equipped with reading and recording means 1a. On one side the dynamometer transducer 1 is attached to a U-shaped support member 2. The support member 2 is secured to the end of a tong lever 3 by inserting the member 2 in a bore 4 in the tong lever end and securing it with a bolt 5. The other side of the dynamometer transducer 1 is attached to a yoke 6 by means of an adjusting screw 6a permitting adjustment for a zero initial reading. The yoke 6 is engaged with a bolt 7 passing freely through two oval holes 8 of the support member 2. Yoke 6 has two arms 9 at the inner surface of support member 2, said arms being provided with bushings 9a permitting removal of bolt 7 in order to introduce the sling 10 of tong line 14 on cathead 12. Removal of bolt 7 leaves yoke 6 secured to the support member 2 by means of the bushings 9a. Initial installation of the dynamometer transducer 1 and the "-zero" adjustment will therefore not be changed by repeated removal and reinstallation of sling 10 of tong line 11.

The oval shape of holes 8 makes it possible for the dynamometer transducer 1 to be compressed while under load, i.e. if a hydraulic dynamometer is improperly filled with liquid and air pockets are formed, or the dynamometer transducer is spring-loaded.

The end sling 10 of the tong line 11 handled by cathead 12 is slipped on bolt 7, so as to continuously guide the tong line perpendicularly to the tong lever 3 as far as the axis of bolt 5, where line 11 is bent at an angle $\alpha$, corresponding to the variable operating position of tong lever 3. The bending of line 11 at an angle $\alpha$ at the axis of bolt 5 is effected by the resting of the line against the arms 9 of yoke 6.

Neglecting the stiffness and friction, etc. of line 11, the pull $F_o$ thereon can be considered to be transmitted directly to bolt 7.

As shown in FIG. 1c, the reaction $R$ due to the bend in line 11 is made up of two components: a tangential component $R_t$, along the axis of the tong lever 3, and a normal component $R_r$, normal to the axis of the tong lever 3, and the reaction $R$ is defined by the following relations:

$R = 2F_o \sin \alpha/2$ $R_t = R \sin \alpha/2 = 2 F_o \sin \alpha/2$ $R_r = \cos \alpha/2 = 2 F_o \sin \alpha/2 \cdot \cos \alpha/2$ The component $R_r$ is transmitted axially to the tong lever without influencing the torque gauge, which is the component normal to the tong lever 3 of the force $F$ The component $R_t$ is transmitted to the arms 9 of yoke 6 via bolt 7. Here the following equilibrium equation is valid: $F_f = F_o - R_t F_o \cdot \cos \alpha$ In consequence of the force $R_t$ acting upon the yoke 6, the dynamometer transducer 1 is subjected to the action of the difference between forces $F_o$ and $R_t$, i.e. the force $F_f = F_o - R_t$, which is the component normal to the tong is lever 3 of the force $F_o$ occurring in line 11 when the line is at an angle $\alpha$ relative to the tong lever. It thus appears that the actual torque measured will be independent of angle $\alpha$:

$Md_{actual} = l \cdot F_f = l \cdot F_o \cdot \cos \alpha$

If the length $l$ of the tong lever 3 is known, the reading and recording unit 2 can be directly calibrated in torque units (lb-ft).

In another embodiment of the invention, as illustrated in FIGS. 2a through 2c, the arms 9 of yoke 6 are located on the outside of the support member 2. Bending of line 11 at an angle $\alpha$ at bolt 5 is now brought about by the line resting on the support member 2. If stiffness, friction, etc. of the line 11 are neglected, it can be considered that in this case too, the pull $F_o$ is transmitted directly to bolt 7.

As shown in FIG. 2c the reaction $R$ caused by the bending of the line at bolt 5 can be resolved into the same components $R_t$ and $R_r$ as in the case of the first embodiment of the invention, the same defining relations being valid.

As a result, the component $R_r$ is transmitted axially to the tong lever without influencing the torque gauge.

The component $R_t$ is transmitted to the support member 2 and consequently to the tong lever through the medium of bolt 5. The following equilibrium relation is valid:

$F_t = _o - R_t = F_o(1-2\sin^2\alpha/2) = F_o \cdot \cos\alpha$ since: $\cos\alpha = 1 - 2\sin^2\alpha/2$ At the same time, however, $F_t = F_o \cdot \cos\alpha$, wherein $F_t$ is the component normal to the tong lever of the pull $F_o$ in line 11, at the point where the line is at an angle $\alpha$ with respect to the tong lever. Since the force $R_t$ acts directly upon the tong lever, the pull $F_o$ in line 14 will always act upon the dynamometer transducer 1, regardless of angle $\alpha$. Thus again, the theoretical torque that will be measured is given by the expression:

$Md = l \cdot F_o$

A departure will be therefore introduced by the multiplier $\cos\alpha$ with respect to the actual torque $Md_{actual}$. Hence, the gauge of the embodiment of FIGS. 2a—2c is suitable for use where the line is approximately perpendicular to the tong lever.

The advantages of the torque gauge described hereinabove are as follows:

it eliminates the error introduced by the angular deviation of the working position of the tong lever with respect to the pull line, as compared to the theoretical position;

the gauge has greater accuracy and dependability owing to the use of a diaphragm dynamometer transducer of the hydraulic type:

the dynamometer is protected against impact by the yoke transmitting the line pull and to its fixed position on the tong lever; and a special drilling tong with integral torque gauge is thus obtained, or the torque gauge can be directly installed on conventional tongs.

What I claim is:

1. A torque gauge comprising an elongated tong lever having a bore therein remote from a gripping end of the tong lever, a compression dynamometer transducer having opposite surfaces, means securing said transducer via said bore of said tong lever and including a U-shaped support member secured to said tong lever at said bore and extending perpendicularly therefrom and engaging said transducer along one surface thereof, a yoke engaging the other surface of the transducer, a second means positioned between said transducer and tong lever and supported by said yoke for receiving the end of a pull line which can be passed through the bore in the tong lever and bent at said tong lever, and third means secured in said bore of the tong lever and engaging the support member to receive the reaction force of the pull line at the bend therein and cause the yoke and support member to compress the transducer in proportion to the tension in the line as corrected for the angle of the pull line at said bend whereby the transducer indicates a value proportional to the torque produced by the pull line about the gripping end of the tong lever, said second means comprising a bolt engaged with the yoke and said third means comprising a further bolt extending axially in said tong lever and engaged with the support member.

2. A gauge as claimed in claim 1 wherein said yoke includes arms extending within the U-shaped support member and said line is guided between said arms.

3. A gauge as claimed in claim 2 wherein said further bolt is secured in said tong lever along the axis thereof, said line being bent by passing on said further bolt, said support member including arms extending into the opening formed in said tong lever and engaged with said further bolt.

4. A gauge as claimed in claim 3 comprising bearings receiving the first said bolt and engaged with said first yoke and support member to transmit force therebetween in a direction normal to said bolt.

5. A gauge as claimed in claim 1 wherein said yoke includes arms extending outside the U-shaped support member and said line is guided by the U-shaped member between the legs thereof.